US 6,697,899 B1

(12) United States Patent
Kasuga (10) Patent No.: US 6,697,899 B1
(45) Date of Patent: Feb. 24, 2004

(54) BUS CONTROL DEVICE ALLOWING RESOURCES TO BE OCCUPIED FOR EXCLUSIVE ACCESS

(75) Inventor: Yasuhiro Kasuga, Tokyo (JP)

(73) Assignee: NEC Corporation, Tokyo (JP)

(*) Notice: Subject to any disclaimer, the term of this patent is extended or adjusted under 35 U.S.C. 154(b) by 448 days.

(21) Appl. No.: 09/641,953

(22) Filed: Aug. 21, 2000

(30) Foreign Application Priority Data

Oct. 20, 1999 (JP) .......................................... 11-298799

(51) Int. Cl.[7] ................................................. G06F 1/00
(52) U.S. Cl. ........................ 710/108; 710/112; 710/113; 710/200
(58) Field of Search .................. 710/107, 110, 710/112, 113, 119, 306, 310, 309, 20, 21, 108, 52, 57, 200; 711/118, 141, 142–146, 147, 150, 154, 155

(56) References Cited

U.S. PATENT DOCUMENTS

| 5,649,157 | A | * | 7/1997 | Williams | 711/148 |
| 5,659,708 | A | * | 8/1997 | Arimilli et al. | 711/143 |
| 5,870,567 | A | * | 2/1999 | Hausauer et al. | 710/304 |
| 5,890,217 | A | * | 3/1999 | Kabemoto et al. | 711/141 |
| 6,105,094 | A | * | 8/2000 | Lindeman | 710/107 |
| 6,175,888 | B1 | * | 1/2001 | Guthrie et al. | 710/306 |
| 6,209,067 | B1 | * | 3/2001 | Collins et al. | 711/158 |
| 6,247,102 | B1 | * | 6/2001 | Chin et al. | 711/150 |
| 6,374,332 | B1 | * | 4/2002 | Mackenthun et al. | 711/145 |
| 6,442,656 | B1 | * | 8/2002 | Alasti et al. | 711/154 |

FOREIGN PATENT DOCUMENTS

| JP | A 59-191186 | 10/1984 |
| JP | A 3-164963 | 7/1991 |
| JP | A 3-232051 | 10/1991 |
| JP | A 3-271859 | 12/1991 |
| JP | A 4-140860 | 5/1992 |
| JP | A 4-157543 | 5/1992 |
| JP | A 4-163658 | 6/1992 |
| JP | A 5-53912 | 3/1993 |
| JP | A 6-187230 | 7/1994 |
| JP | A 7-44459 | 2/1995 |
| JP | A 7-287686 | 10/1995 |
| JP | A 8-286968 | 11/1996 |
| JP | A 9-138779 | 5/1997 |
| JP | A 10-232832 | 9/1998 |
| JP | A 10-293718 | 11/1998 |

OTHER PUBLICATIONS

Freerksen et al. (US Pub No. 2002/0035675).*

* cited by examiner

Primary Examiner—Paul R. Myers
Assistant Examiner—Raymond N Phan
(74) Attorney, Agent, or Firm—Young & Thompson (57) ABSTRACT

If an uncachable write from a processor 300 is held in a processor request buffer 130 when a request control circuit 180 detects that a transaction for a cachable read to the processor 300 has been issued to a system bus 400, a retry control circuit 160 requests the transaction to be retried so as to prevent reversal in sequence between a preceding uncachable write and a following cachable read.

9 Claims, 9 Drawing Sheets

FIG. 1

| | V | Command | Address | UW |
|---|---|---|---|---|
| 1 | "1" | "IO-Write" | "123456" | "1" |
| 2 | "0" | | | |
| 3 | "0" | | | |
| 4 | "0" | | | |

| | V | Command | Address | UW | P | |
|---|---|---|---|---|---|---|
| 1 | "1" | "IO-Write" | "123456" | "1" | "0" | ←230 |
| 2 | "0" | | | | | |
| 3 | "0" | | | | | |
| 4 | "0" | | | | | |
| | 235 | 236 | 237 | 238 | 239 | |

BUS CONTROL DEVICE ALLOWING RESOURCES TO BE OCCUPIED FOR EXCLUSIVE ACCESS

BACKGROUND OF THE INVENTION

1. Field of the Invention

The present invention relates to a bus control device, and in particular, to a bus control device for effecting control such that particular resources are occupied for exclusive accesses.

2. Description of Related Art

In a multiprocessor system, a processor may exclusively access a particular resource such as an I/O device. In this case, to prohibit the other processors from accessing this particular resource, a corresponding lock variable (also referred to as a "lock word") is locked; the lock variable is unlocked after an exclusive access has been completed.

Figure 8:
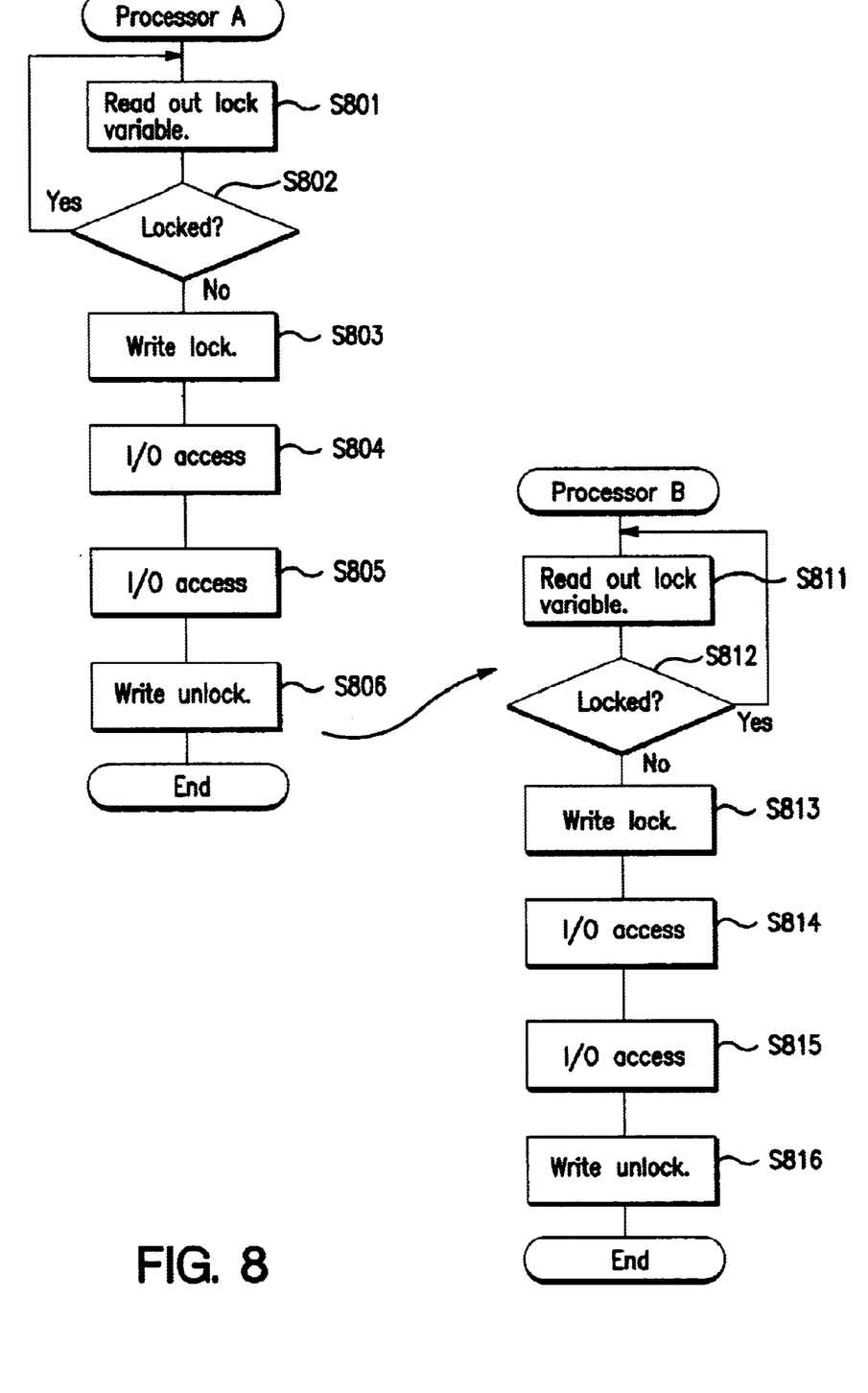
FIG. 8 is a diagram explaining a lock sequence for locking or unlocking between different processors.

Referring to FIG. 8, when a processor A reads out a lock variable corresponding to an I/O device which it is to access (step S801), and judges that the lock variable is unlocked (step S802), it locks the variable (step S803) Subsequently, the processor A accesses this I/O device (step S804), and after completing the final access (step S805), it unlocks the variable again (step S806).

On the other hand, if a processor B attempts to access the same I/O device, it first reads out the lock variable (step S811), but if the variable is already locked by the processor A, it waits for the variable to be unlocked. When the processor A unlocks the variable (step S806), the processor B then locks the variable (step S813). Subsequently, the processor B accesses this I/O device (step S814), and after completing the final access (step S815), it unlocks the variable again (step S816). In this manner, the lock function ensures exclusive accesses to resources such as I/O devices.

With the above described conventional technique, however, if a lock variable is present in a cache memory, a change in lock variable is completed between the processor and the cache memory. This operation is fast, but since I/O accesses are uncachable, that is, these accesses are made via a system bus without the use of the cache memory, the lock operation and the I/O access may be mutually reversed as described below. The cachable access using the cache memory and the uncachable access without the use of the cache memory are mutually separated using, for example, the attribute of each page or specifications in fields in the request.

Figure 9:
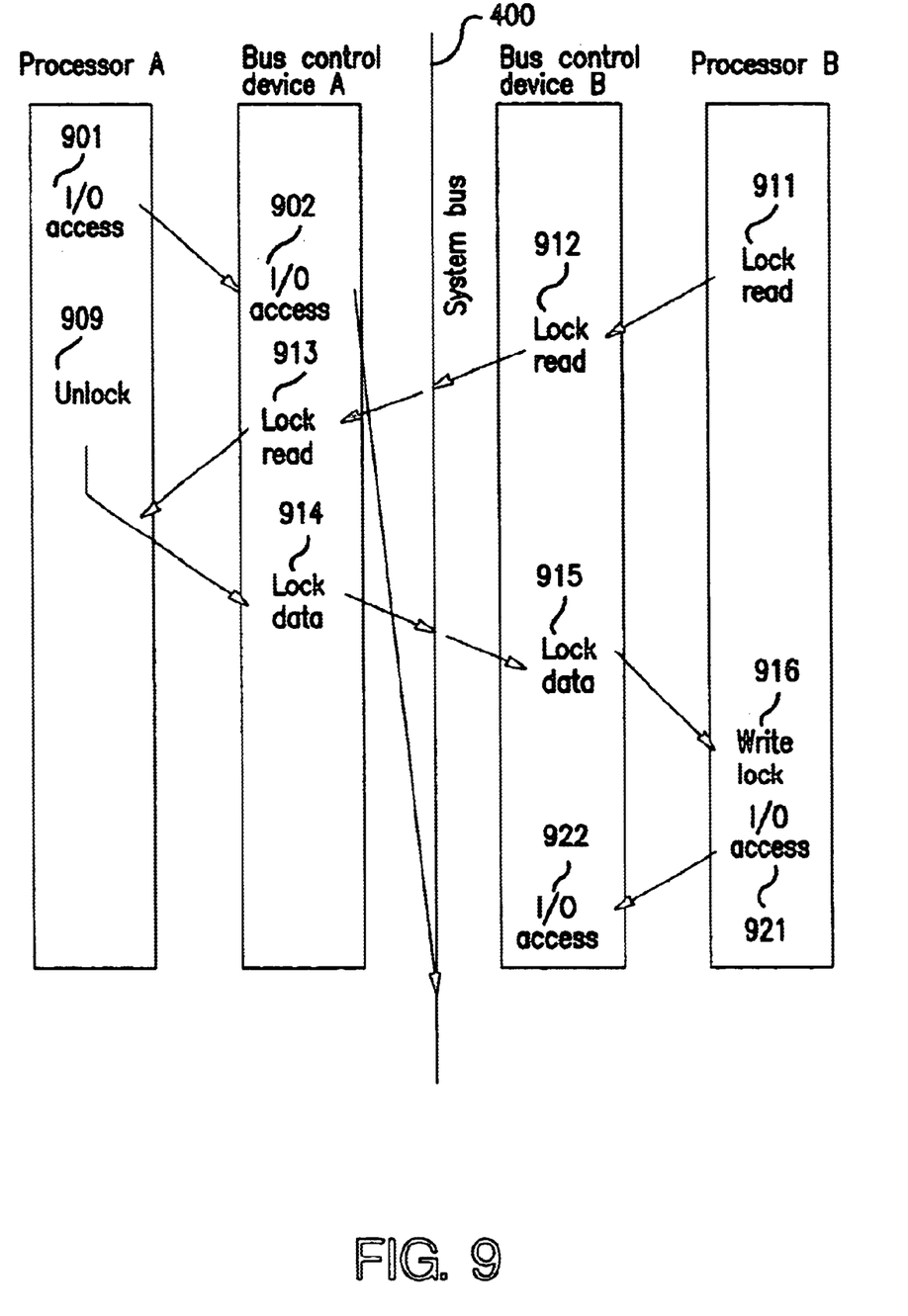
FIG. 9 is a diagram explaining reversal of accesses in a conventional configuration.

Referring to FIG. 9, the final I/O access (901), which was issued by the processor A and then transferred to a bus control device A (902), has not been issued to a system bus 400. Due to the issue completion of the final I/O access, the processor A unlocks the lock variable, but the lock variable is actually present in its own cache memory. Therefore, the lock variable is accessed by accessing the cache memory (909). On the other hand, when the processor B requests the lock variable to be read out (911), a bus control device B issues this request to the system bus 400 (912) Since this read-out request hits the cache memory of the processor A, the bus control device A issues a read-out request to the processor A (913), which then returns read-out data including the lock variable to the system bus 400 via the bus control device A (914). A path used by the bus control device A to issue the I/O access to the system bus 400 differs from a path used by the same to return the read-out data to the system bus 400, so that the read-out data including the lock variable may be returned to the system bus before the above I/O access is issued to the system bus. The data including the lock variable is returned to the processor B via the bus control device B (915), thereby allowing the processor B to confirm that the lock variable is unlocked. After locking the lock variable (916), the processor B issues the first I/O access to the processor B (921), and the bus control device B issues the first I/O access of the processor B to the system bus 400 (922). Subsequently, when the bus control device A issues the I/O access of the processor A (902) to the system bus 400, the previously executed I/O access is temporally overtaken by the subsequently executed I/O access. If the previously executed I/O access is a write access and the subsequently executed I/O access is a read access, then old data, which is not updated by the previously executed I/O write access, is read out, resulting in data inconsistency.

SUMMARY OF THE INVENTION

It is an object of the present invention to solve the above-described problem to ensure exclusive accesses to particular resources.

A bus control device according to the present invention operates when a predetermined read-out request is issued on a bus, to command the read-out request to be retried if a predetermined write from a higher device has not been completed.

In addition, the bus control device according to the present invention is connected between a higher device and a bus, and includes a request buffer that holds a request issued from the higher device, and a retry control circuit operating when a predetermined read-out request is issued on the bus, to command the read-out request to be retried if the request held in the request buffer has been obtained through a predetermined write.

Additionally, an information processing system according to the present invention includes a higher device, a bus, and a bus control device connected between the higher device and the bus, wherein the bus control device includes a request buffer that holds a request issued from the higher device and a retry control circuit operating when a predetermined read-out request is issued on the bus, to command the read-out request to be retried if the request held in the request buffer has been obtained through a predetermined write.

BRIEF DESCRIPTION OF THE DRAWINGS

The above and other objects, features and advantages of the present invention will become more apparent upon a reading of the following detailed description taken in conjunction with the accompanying drawings, in which.

DESCRIPTION OF THE PREFERRED EMBODIMENTS

Embodiments of a bus control device according to the present invention will be described below in detail with reference to the drawings.

Figure 1:
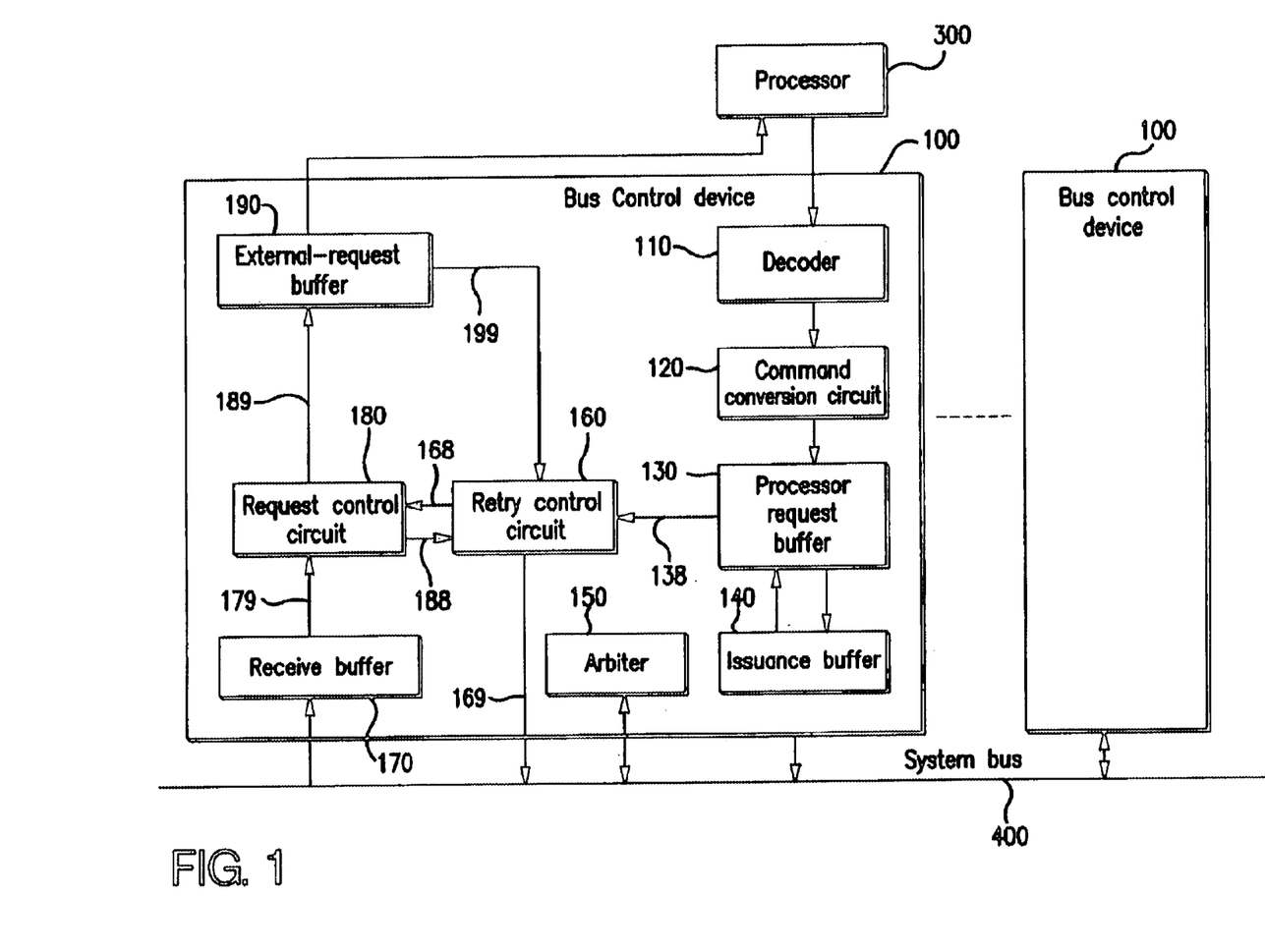
FIG. 1 is a block diagram showing the configuration of a multiprocessor system including a first embodiment of a bus control device of the present invention.

Referring to FIG. 1, a bus control device 100 according to a first embodiment of the present invention is connected between a processor 300 and a system bus 400 to control transmissions therebetween. Specifically, the bus control device 100 receives a request from the processor 300 (hereafter referred to as a "processor request") to issue a transaction to the system bus 400. The bus control device 100 also receives a transaction from the system bus 400 to issue a request (hereafter referred to as an "external request") to the processor 300. The bus control device 100 connects not only to the processor but also to a main memory or an I/O bus such as a PCI bus. The processor or the like connected to the bus control device 100 is collectively referred to as a "higher device."

The bus control device 100 includes a decoder 110 which decodes a processor request from the processor 300, a command conversion circuit 120 which converts the format of the decoded processor request, a processor request buffer 130 which holds the processor request, and an issuance buffer 140 which holds a transaction issued to the system bus 400. The bus control device 100 further includes an arbiter 150 which arbitrates for the system bus 400, a retry control circuit 160 which controls a retry of the transaction, a receive buffer 170 which holds the transaction received from the system bus 400, a request control circuit 180 which generates an external request from the transaction, and an external-request buffer 190 which holds an external request for the processor 300. The processor request includes accesses to a main storage device (not shown) or an I/O device, and the external request includes invalidation of a cache memory 310 and intervention therein (a check of whether or not the cache memory 310 has a valid entry). The cache memory 310 may be included in the processor 300 or may be external to the processor 300.

A processor request issued by the processor 300 is decoded by the decoder 110 and then converted by the command conversion circuit 120 into a command of a format specified for the system bus 400; the command thus obtained is stored in the processor request buffer 130. In response to a command from the issuance buffer 140, the processor request buffer 130 transfers a transaction to the transaction issuance buffer 140. The issuance buffer 140 makes a request to the arbiter 150 to obtain the right to use the system bus 400. The arbiter 150 arbitrates for the system bus 400, and once the right to use the system bus 400 has been obtained, it notifies the issuance buffer 140 of the acquisition. On being notified by the arbiter 150 of the acquisition of the right to use the system bus 400, the issuance buffer 140 issues a transaction to the system bus 400.

The transaction issued to the system bus 400 is received by the receive buffer 170, which then transfers it to the request control circuit 180. The request control circuit 180 judges whether or not the received transaction is to be issued to the processor 300 as an external request, and if so, converts the transaction into a command of a format specified for the processor 300 and stores this command in the external-request buffer 190. The external-request buffer 190 issues an external request to the processor 300. The retry control circuit 160 has a function for allowing a transaction issued to the system bus 400 to be retried.

Figure 2:
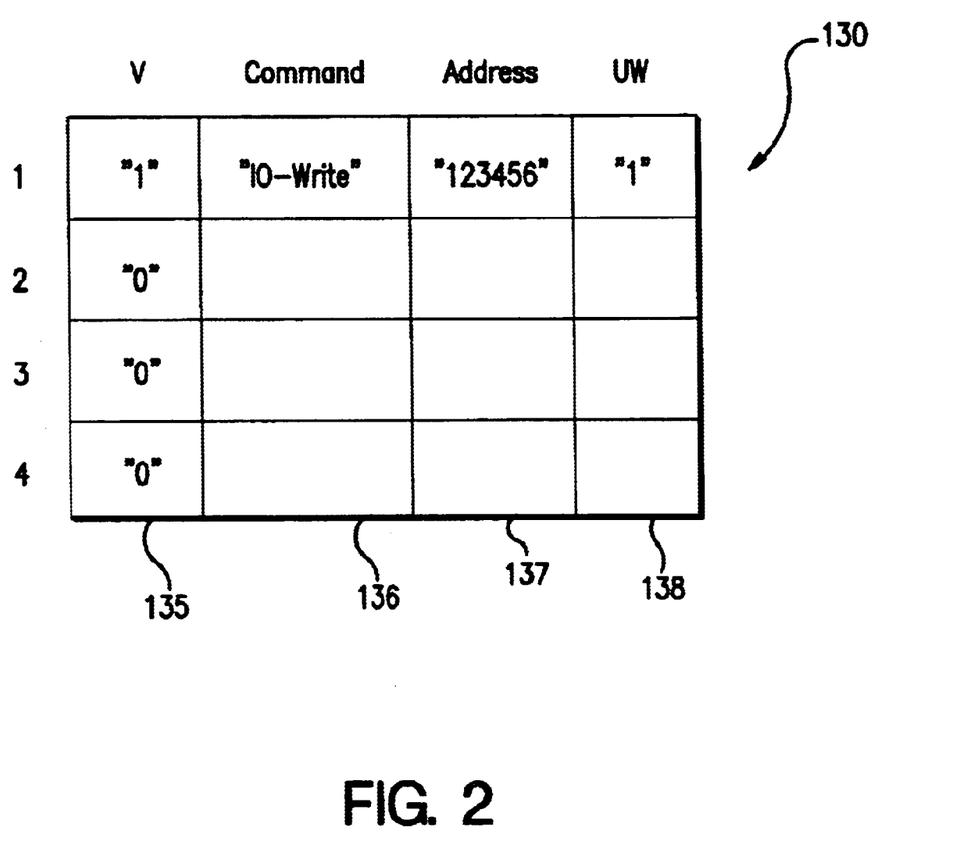
FIG. 2 is a diagram showing the configuration of a processor request buffer according to the first embodiment.

Referring to FIG. 2, the processor request buffer 130 stores V bits 135 each indicating whether it stores a valid processor request, commands 136 and addresses 137 that each have been converted into a format specified for the system bus 400, and UW flags 138 each indicating whether the processor request is an uncachable write for the I/O device. In this case, four processor requests can be stored, but an optimal value may be employed for the number of processor requests depending on system configuration.

Figure 3:
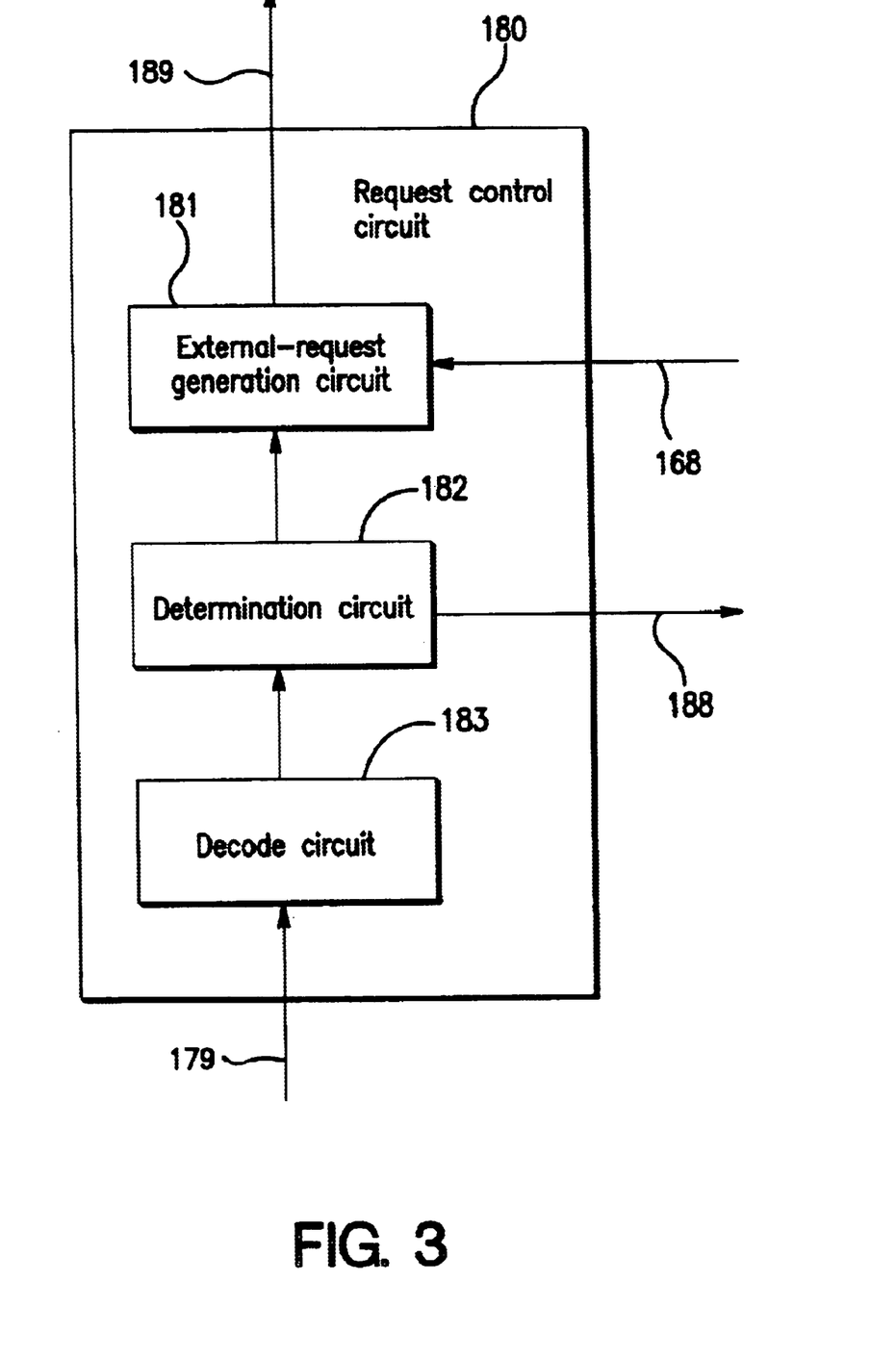
FIG. 3 is a diagram showing the configuration of a request control circuit according to the first embodiment.

Referring to FIG. 3, the request control circuit 180 includes a decode circuit 183, a determination circuit 182, and an external-request generation circuit 181. The decode circuit 183 receives through a signal line 179 the transaction held in the receive buffer 170 and decodes it. The determination circuit 182 determines whether or not to transfer the transaction decoded by the decode circuit 183 to the processor 300 and whether or not the transaction is a read that can be held in the cache memory, that is, whether or not it is a cachable read. On determining that the transaction is to be transferred to the processor 300, the external-request generation circuit 181 generates an external request to the processor 300 and outputs it to a signal line 189.

Figure 4:
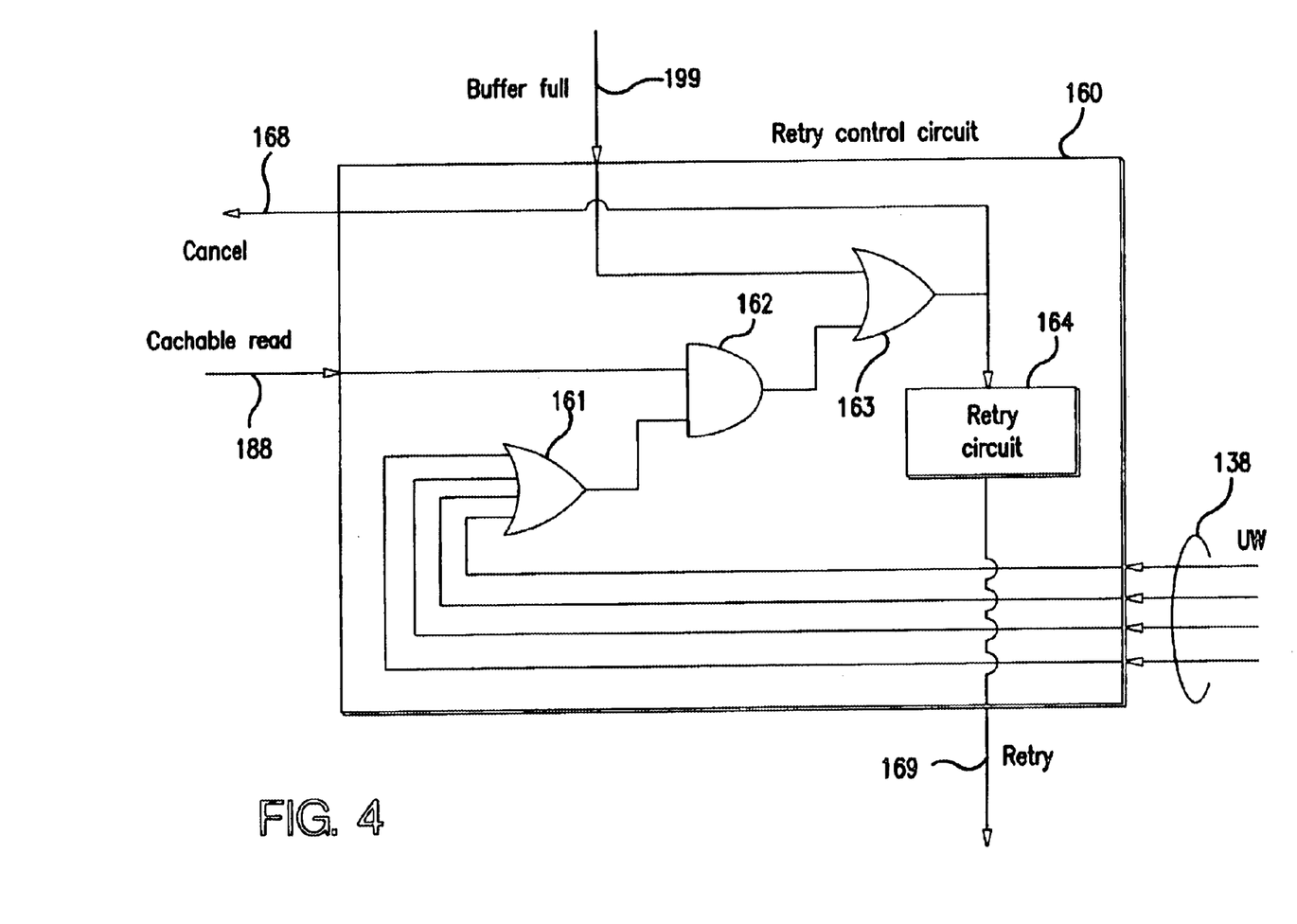
FIG. 4 is a diagram showing the configuration of a retry control circuit according to the first embodiment.

Referring to FIG. 4, the retry control circuit 160 includes an OR circuit 161 for generating an OR of the UW flags 138 in the processor request buffer 130, an AND circuit 162 for generating an AND of a result of the OR circuit 161 and a signal 188 from the request control circuit 180 indicating the cachable read, an OR circuit 163 for generating an OR of a result of the AND circuit 162 and a signal 199 from the external-request buffer 190 indicating buffer full (indicating that the external-request buffer has no empty space), and a retry circuit 164 for using a signal line 169 to command the transaction to be retried if an output from the OR circuit 163 indicates a logical "1."

Next, the operation of the first embodiment of the present invention will be described with reference to the drawings.

Referring to FIGS. 1 to 4, a processor request issued from the processor 300 includes an address field indicating a resource targeted by the request and a command field indicating the type of the request. These address and command are decoded by the decoder 110, and based on a result of the decoding, the command is converted by the command conversion circuit 120. Since the processor 300 and the system bus 400 use different bus protocols, the command must be generated or converted so as to be compatible with each of the protocols. The converted command is stored in the command field 136 in the processor request buffer 130, while the address is stored in the address field 137 of the processor request buffer 130. Furthermore, the V bit 135 of the processor request buffer 130 is set to "1" to indicate that the processor request is valid. In addition, if the decoding result indicates that the processor request is an uncachable write to the I/O device, the UW flag 138 of the processor request buffer 130 is set to "1." One or more (in FIG. 2, four) processor requests can be stored in the processor request buffer 130 and are transferred to the issuance buffer 140 in the order of issuance from the processor 300.

Since a plurality of bus control devices 100 is connected to the system bus 400, waiting is required to issue a transaction to the system bus 400. Thus, the issuance buffer 140 controls the transfer of the processor request from the processor request buffer 130 depending on the usage of the system bus 400. Once the issuance of the transaction to the system bus 400 has been completed, the issuance buffer 140 sends an issuance completion notification to the processor request buffer 130. On receiving the issuance completion notification, the processor request buffer 130 clears the V bit 135 to "0" and also clears the UW flag 138 to "0" if it has been set to "1." If the processor request buffer 130 stores the next processor request, the processor request buffer 130 transfers this new request to the issuance buffer 140.

To issue a transaction to the system bus 400, the issuance buffer 140 sends a right-to-use request of the system bus 400 to the arbiter 150. The arbiter 150 arbitrates for the right to use the bus in accordance with a right-to-use arbitration rule in the system bus 400. The arbitration rule may comprise a conventional technique such as fixed preference or round robin. Once the right to use the system bus 400 has been obtained, the arbiter 150 sends a notification of a right to use the bus to the issuance buffer 140. On receiving the notification of the right to use the bus, the issuance buffer 140 issues a transaction to the system bus 400.

The transaction issued to the system bus 400 is monitored by all bus control devices 100 connected to the system bus 400, and the bus control devices 100 each obtain the transaction to subject it to required processing if the transaction is related to the own device. The transaction issued to the system bus 400 is held in the receive buffer 170 and subsequently transferred to the request control circuit 180.

In the request control circuit 180, the decode circuit 183 decodes the transaction and sends a result to the determination circuit 182. The determination circuit 182 determines whether or not to transfer the transaction to the processor 300 and whether or not the transaction is a cachable read. If the determination circuit 182 judges that the transaction is to be transferred to the processor 300, the external-request generation circuit 181 generates an external request. On the other hand, if the transaction is a cachable read, a notification is sent to the retry control circuit 160 through the signal line 188. The external-request generation circuit 181 generates an external request and stores it in the external-request buffer 190 if no cancel signal 168 is communicated from the retry control circuit 160. If the external-request generation circuit 181 receives the cancel signal 168, it discards the external request instead of storing it.

The external-request buffer 190 can store one or more external requests and issues these requests to the processor 300 in the order of issuance to the system bus 400. In addition, when the external-request buffer 190 has no empty space for storing external requests, it uses the buffer full signal 199 to request the retry control circuit 160 to retry the transaction. If the external-request buffer 190 has no empty space or if the retry control circuit 160 receives a cachable read from the system bus 400 when the UW flag 138 of the processor request buffer 130 is set to "1," then the retry control circuit 160 allows the transaction on the system bus 400 to be retried. Since there are as many UW flags 138 as the stages of the processor request buffer 130, the OR circuit 161 first generates an OR of all the UW flags 138. The AND circuit 162 generates an AND of a result of the OR circuit 161 and the cachable read notification signal 188 from the determination circuit 182 of the request control circuit 180, to produce one of the conditions for a retry of the transaction. Since the other condition is indicated by the buffer full signal 199 from the external-request buffer 190, the OR circuit 163 generates an OR of a result from the AND circuit 162 and the buffer full signal 199 to produce a transaction retry condition. When one of the retry conditions is established, the retry circuit 164 commands the system bus 400 to retry the transaction, and an output signal from the OR circuit 163 is communicated to the request control circuit 180 as the cancel signal 168. This prevents external requests from being stored in the external-request buffer 190.

As described above, according to the first embodiment of the present invention, if the processor request buffer 130 holds an uncachable write when a transaction for a cachable read is issued on the system bus 400, the retry control circuit 160 can request the transaction to be retried to ensure the correct sequence between the uncachable write and the cachable read.

Next, a second embodiment of a bus control device according to the present invention will be described in detail with reference to the drawings.

Figure 5:
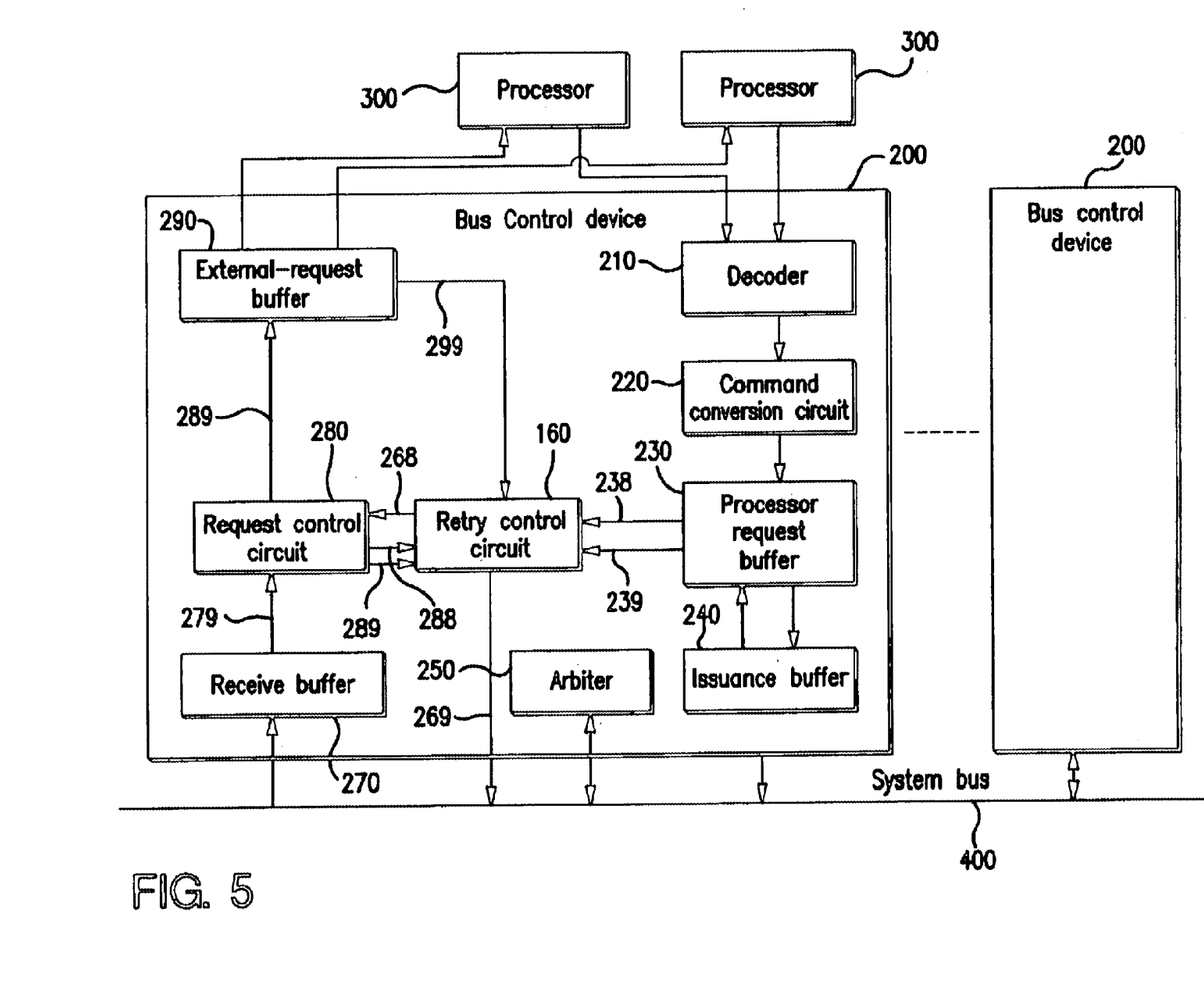
FIG. 5 is a block diagram showing the configuration of a multiprocessor system including a second embodiment of a bus control device of the present invention.

Referring to FIG. 5, a bus control device 200 according to the second embodiment of the present invention has two processors connected thereto. With two processors one of which holds no uncachable write, a cachable read can be issued to this processor. Accordingly, processor requests from the two processors are separately managed to avoid unwanted waits.

Figure 6:
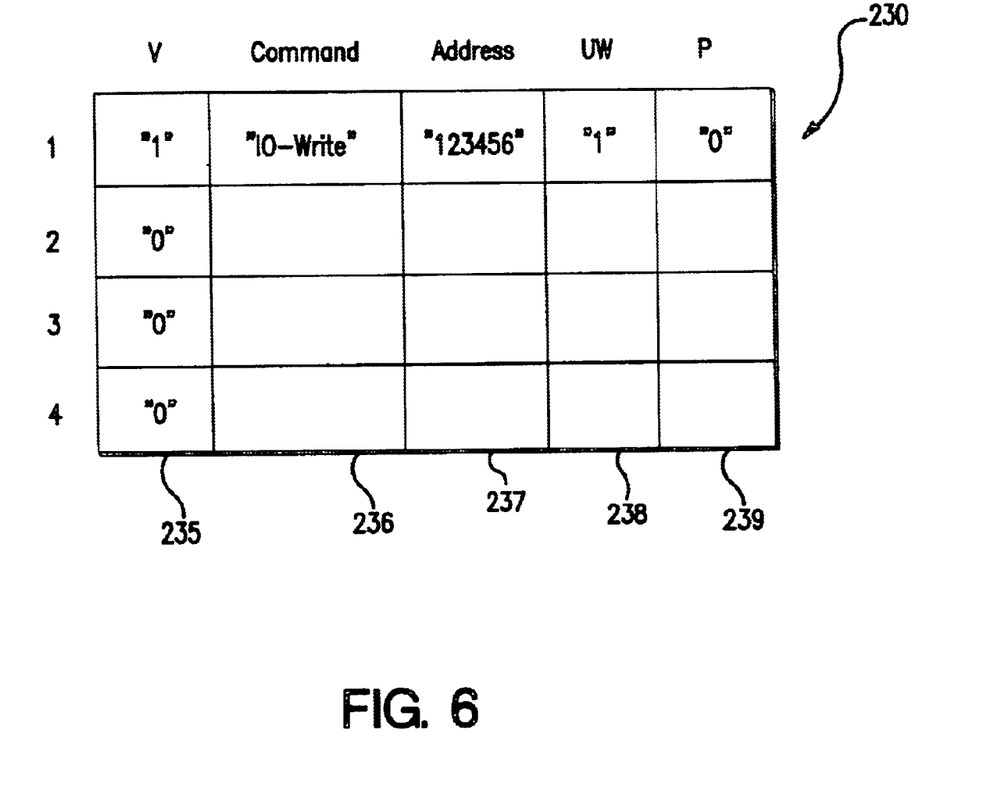
FIG. 6 is a diagram showing the configuration of a processor request buffer according to the second embodiment.

Referring to FIG. 6, a processor request buffer 230 according to the second embodiment has an additional P bit 239 for indicating which of the processors has issued the processor request compared to the processor request buffer 130 according to the first embodiment described with reference to FIG. 2. For example, with two processors connected to the bus control device, one of the processors can be represented by "0" and the other can be represented by "1".

Figure 7:
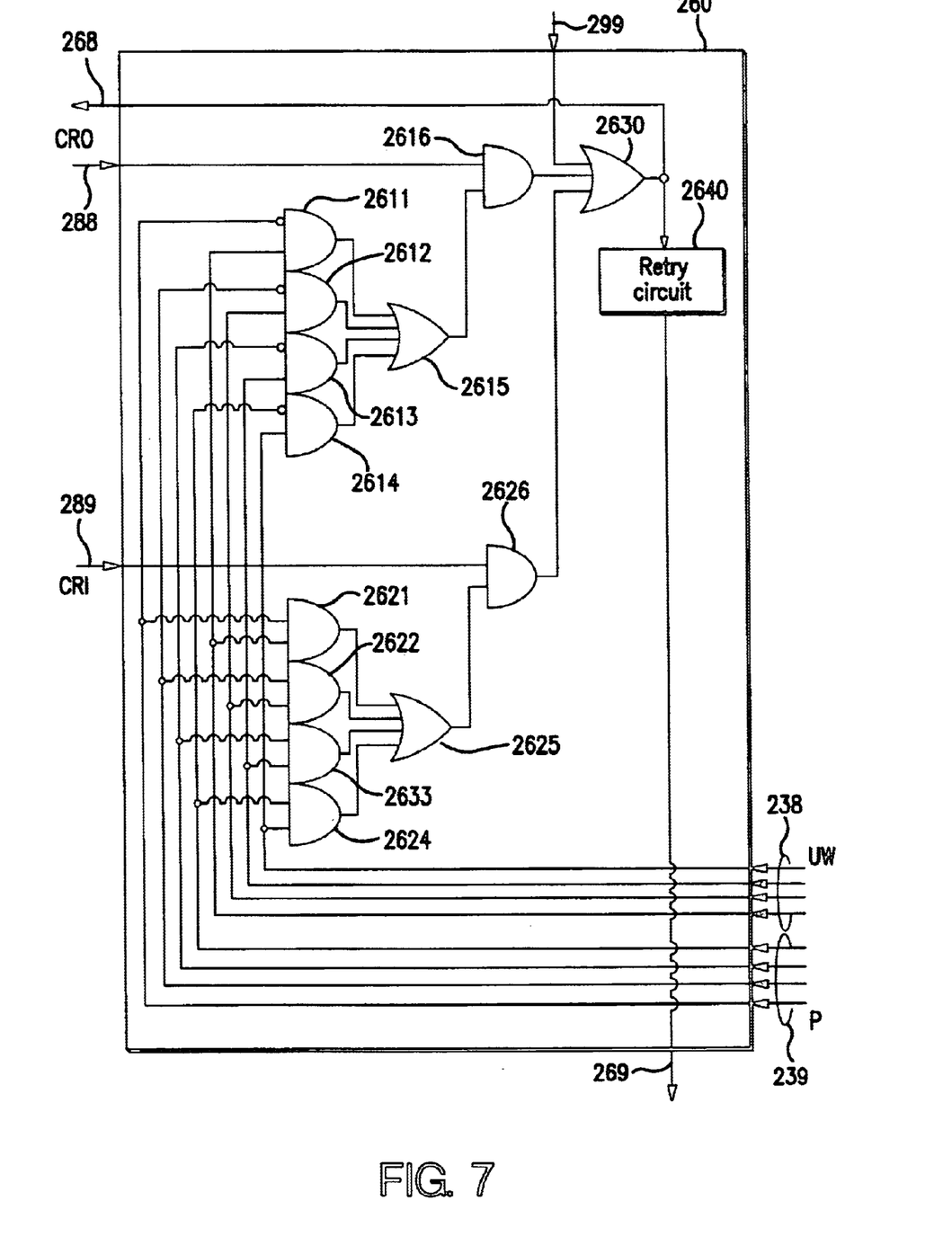
FIG. 7 is a diagram showing the configuration of a retry control circuit according to the second embodiment.

Referring to FIG. 7, a retry control circuit 260 according to the second embodiment establishes independent retry conditions for each processor. First, AND circuits 2611 to 2614 and 2621 to 2624 generate an AND of the UW flag 238 in each stage of the processor request buffer 230 and of the P bit 239. Then, if the P bit 239 is set to "0" for a processor request from the processor A and to "1" for a processor request from the other processor B, the AND circuits 2611 to 2614 can detect uncachable writes issued by the processor A, whereas the AND circuits 2621 to 2624 can detect uncachable writes issued by the processor B. Furthermore, the OR circuit 2615 combines the uncachable writes from the processor A, while the OR circuit 2625 combines the uncachable writes from the processor B. An AND circuit 2616 generates an AND of a result from the AND circuit 2616 and a signal 288 indicating a cachable read for the processor A, while an AND circuit 2626 generates an AND of a result from the OR circuit 2625 and a signal 289 indicating a cachable read for the processor B. Finally, an OR circuit 2630 can generate an OR of a result from the AND circuit 2616, a result from the AND circuit 2626, and a buffer full signal 299 from an external-request buffer 290, to prevent a retry of the transaction on the system bus 400 and storage of external requests in the external-request buffer 290.

As described above, the second embodiment of the present invention provides the P bit 239 for identifying a processor having an uncachable write pending in the processor request buffer 230. Consequently, a cachable read can be prevented from being issued to the processor having the uncachable write pending, whereas it can be issued to the other processor, thereby reducing extra retries to prevent the flow of requests and transactions from being interrupted.

As is apparent from the above description, the present invention can implement exclusive accesses to resources such as I/O devices by ensuring the correct sequence between an uncachable writes and a cachable read.

Although preferred embodiments of the present invention have been described in detail, it should be understood that various changes, substitutions and alternations can be made therein without departing from spirit and scope of the inventions as defined by the appended claims.

What is claimed is:

1. A bus control device wherein requests of exclusive access are issued by using a lock variable held in cache memory, comprising:

a circuit which communicates with a bus and which monitors when a cachable read-out request, which requires said a lock variable, has been issued on the bus, and a retry control circuit which commands said cachable read-out request to be retried when an uncachable write request to be preceded has not been issued to the bus.

2. A bus control device connected between a higher device and a bus, comprising:

a request buffer which holds a request issued from said higher device; and a retry control circuit which operates, when a cachable read-out request, which requires said a lock variable, is issued on said bus, to command the cachable read-out request to be retried if a request held in said request buffer is an uncachable write request to be preceded and has not been issued to the bus.

3. The bus control device according to claim 2, further comprising:

a request control circuit which determines that the cachable read-out request has been issued on said bus and which notifies said retry control circuit of this issuance.

4. The bus control device according to claim 3, wherein said request control circuit comprises an external-request generation circuit which generates an external request and which transfers the external request to the higher device if a request issued on said bus requires a transfer to the higher device.

5. The bus control device according to claim 4, wherein said external-request generating circuit prevents said external request from transferring to the higher device when said retry control circuit judges that the cachable read-out request has been issued on said bus in case a request held in said request buffer is the uncachable write to be preceded and has not been issued to the bus.

6. The bus control device according to claim 5, further comprising:

a external request buffer which holds the external requests outputted from said external-request generation circuit, wherein said external request buffer outputs a buffer full signal to said retry control circuit when said external request buffer has no empty space for storing external requests; and said retry control circuit, which received said buffer full signal, commands the request which has been issued on said bus to be retried.

7. The bus control device according to claim 2, wherein said bus control device is connected to a plurality of higher devices;

said request buffer holds identifiers each indicating which of said plurality of higher devices has issued a held request; and if the request held in said request buffer is the uncachable write and when the cachable read-out request is issued on said bus, said retry control circuit commands the cachable read-out request to be retried if the higher device, to which the cachable read-out request is to be transferred, matches the identifier corresponding to the request held in said request buffer.

8. The bus control device according to claim 2, wherein said requests issued from said higher device are exclusive accesses, and a lock variable which represents a right to use the bus is present in a cache memory connected to the higher device.

9. An information processing system comprising a bus, a higher device which uses said bus exclusively, and a bus control device connected between said higher device and said bus, wherein said bus control device includes a request buffer which holds a request issued from said higher device and a retry control circuit which operates when a cachable read-out request is issued on said bus, to command the cachable read-out request to be retried if the request held in the request buffer is an uncachable write to be preceded and has not been issued to the bus.

* * * * *